United States Patent [19]
De Wavrechin

[11] 3,798,567
[45] Mar. 19, 1974

[54] LASER GENERATOR
[75] Inventor: Regis De Wavrechin, Ivry-sur-Seine, France
[73] Assignee: Compagnie Generale D'Electricite, Paris, France
[22] Filed: June 21, 1972
[21] Appl. No.: 265,038

[30] Foreign Application Priority Data
June 23, 1971 France .............................. 71.22886

[52] U.S. Cl. ................................ 331/94.5, 350/310
[51] Int. Cl. ............................................. H01s 3/02
[58] Field of Search .................... 331/94.5; 350/310

[56] References Cited
UNITED STATES PATENTS
3,229,224   1/1966   Waly et al. ........................ 331/94.5
3,277,396   10/1966   Statz et al. ......................... 331/94.5

OTHER PUBLICATIONS
Sporton, J. Sci. Instrum., Vol. 44, 1967, pp. 720–724 Note FIG. 3, Especially, QC 1.
Johnson, IEEE J. of Quantum Electronics, pp. 701–703 QC 447I2 (1968).

Primary Examiner—Ronald L. Wibert
Assistant Examiner—R. J. Webster
Attorney, Agent, or Firm—Sughrue, Rothwell, Mion, Zinn & Macpeak

[57] ABSTRACT

The positions of the reflector and the optical element are regulated with respect to the active medium through a sleeve which surrounds a portion of the optical resonant cavity of a laser generator.

3 Claims, 1 Drawing Figure

PATENTED MAR 19 1974 3,798,567
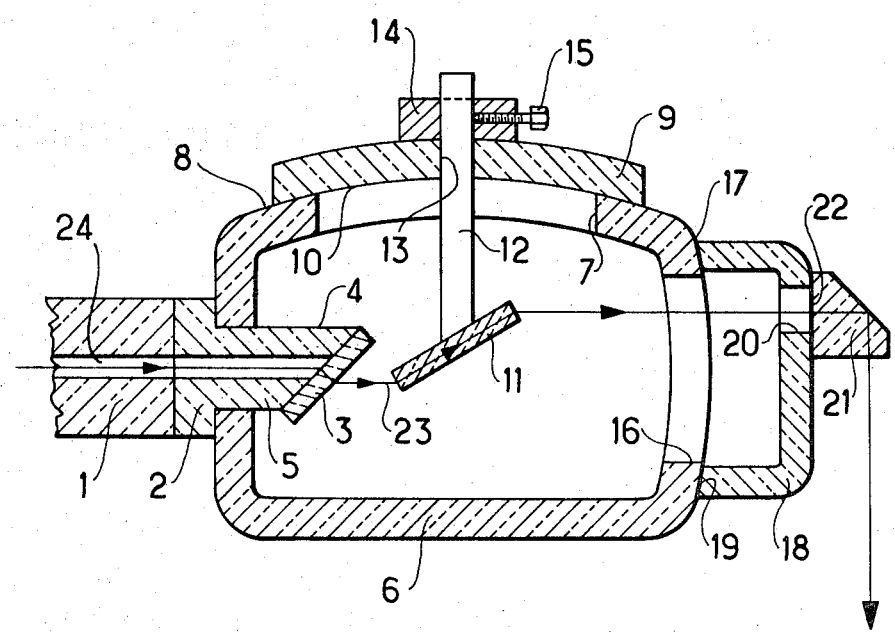

LASER GENERATOR

BACKGROUND OF THE INVENTION

1. Field Of The Invention

The present invention relates to laser generators.

2. Description Of The Prior Art

Laser generators are known which comprise an active material disposed in a cavity delimited by two optical elements constituted by two reflectors one of which is semi-transparent, and pumping means associated with the active material. The laser generators may also comprise, within or externally of the cavity, supplementary optical elements such as prisms, mirrors or electro-optical cells, for deflecting, for example, the beam emitted by the laser generator or modulating the intensity thereof. Such laser generators generally comprise a pedestal or base, such as an optical bench, on which are secured, on the one hand, the active material and on the other hand, supports on each of which an optical element is mounted, the supports being provided with mechanical control means such as micrometric screws for regulating the position of the optical elements relative to the active material.

These laser generators have the disadvantage that they are heavy and bulky. Furthermore, temperature variations and vibrations often result in disarrangement of the position of the optical elements relative to the active material.

It is the object of the invention to palliate these disadvantages and to provide an exteremly simple and extremely robust laser generator wherein the optical elements delimiting the cavity and those disposed within or externally of the said cavity are readily adjusted as to position.

SUMMARY OF THE INVENTION

The present invention relates to a laser generator comprising: a cavity constituted by two reflectors, with an active medium disposed in the cavity. Pumping means are associated with the active medium, and an optical element is disposed between the active medium and one of the said reflectors. The generator is characterized, notably, in that it comprises a sleeve mechanically cooperating with the active medium and surrounding a portion of the cavity between the active medium and the reflector. Further, means cooperate with the wall of the sleeve to regulate the position of the optical element relative to the active medium, and means cooperate with the wall of the sleeve to regulate the position of the deflector relative to the active medium.

BRIEF DESCRIPTION OF THE DRAWING

The present invention will be better understood on reading the description given hereinbelow with reference to the accompanying drawing which is purely illustrative and non-limitative and in which the single FIGURE shows, in axial section, an embodiment of the laser generator according to the invention.

DESCRIPTION OF THE PREFERRED EMBODIMENT

The FIGURE shows, partly, a gas laser generator comprising a discharge tube consisting of a capillary tube 1 to one end of which there is secured, for example by welding, a tubular end piece 2, the axis of which coincides with that of the capillary tube 1. The end piece supports a window 3 which is inclined relative to the axis in accordance with Brewster's angle of incidence.

A machined portion 4 of the external surface of the end piece 2 is introduced into an axial aperture 5 formed in a sleeve 6. The aperture 5 is formed in such manner that its diameter is slightly larger than the diameter of the surface 4, so as to afford the tightest possible interengagement. The sleeve 6 is also formed with a radial aperture 7, the wall of the sleeve 6 being machined in the vicinity of the aperture 7 in such manner as to produce a semi-spherical surface 8, the center of curvature of which is advantageously located on the axis 23 of the laser beam emanating from the discharge tube. A semi-spherical dish 9 is disposed on the sleeve 6 in such manner as to obturate the aperture 7, a portion 10 of the surface of the said dish cooperating with the surface 8 of the sleeve 6 in such manner as to constitute a ball-joint. The dish 9 is formed with an aperture 13 in which a rod 12 is able to slide, the position of the rod relative to the dish 9 being capable of being immobilized with the aid of a washer 14 provided with a blocking screw 15.

An optical element which, referring to the FIGURE, is constituted by a crystal 11 of potassium deuterium phosphate, is secured on the rod 12, for example by adhesive. The face of the crystal 11 receiving the laser beam is disposed substantially at the center of curvature of the surface 8 and the said crystal 11 may be provided with two electrodes (not shown) connected by conductors extending through an aperture formed axially in the rod 12 to a pulse generator (not shown), so as to modulate the intensity of the beam emitted by the laser generator.

The sleeve 6 has, on the side opposite the aperture 5, a further axial aperture 16, the wall of the sleeve 6 located in proximity of the aperture 16 being machined in such manner as to produce a semi-spherical surface 17. A cup 18 is disposed on the sleeve 6 in such manner as to cover the aperture 16, an edge portion 19 of the surface of the cup 18 cooperating with the surface 17 of the sleeve 6 in such manner as to constitute a ball-joint. A prism 21 is secured on the cup 18 in such manner as to cover an aperture 20 formed in the said cup, for example by means of adhesive on one of its faces 22 which is optically treated to afford a semi-transparent mirror at the outlet of the laser resonant cavity.

The elements 1, 2, 6, 9, 12 and 18 are advantageously manufactured from a transparent material having a low coefficient of thermal expansion, for example silicon.

The portion of the laser generator which is not shown in the FIGURE may be produced in known manner; for example, the discharge tube, closed at the other end of the capillary tube 1 so as to constitute a Brewster incidence angle window, comprises two electrodes disposed in cells communicating with the interior of the tube in which is disposed an active medium 24 constituted by a gas; these electrodes are connected to pumping means consisting for example of a high frequency voltage generator; a mirror disposed on the axis of the discharge tube closes the laser resonant cavity.

The various regulation steps permitted by the structure of the laser generator shown in the FIGURE are as follows. Orientation of the faces of the crystal 11 of potassium deuterium phosphate relative to the laser beam having the axis 23 may be regulated by manually sliding the dish 9 on the sleeve 6. The distance between the optical element 11 and the dish 9 may be regulated by sliding the rod 12 in the aperture 13 formed in the dish 9 and the position of the said rod 12 may be locked with the aid of the screw 15. Similarly, orientation of the face 22 of the prism 21 relative to the laser beam may be regulated by manually sliding the cup 18 on the sleeve 6. If the members 6, 9 and 18 are manufactured from silicon, it is possible to machine the contact surfaces 8, 10, 17 and 19 with a degree of precision such that it permits highly progressive sliding of the dish 9 and of the cup 18 on the sleeve 6, the molecular attraction being capable of maintaining the members 9 and 18 in their regulating position on the sleeve 6.

It will be clear from the description given hereinabove that the laser generator according to the invention permits the achievement in extremely simple manner of the positional regulation of at least one reflector delimiting the cavity and of an optical element disposed within the said cavity. The present laser generator withstands perfectly vibrations and temperature variations. It has, furthermore, the advantage that it protects against dust the optical elements cooperating with the laser beam. The compact structure of the said laser generator makes it suitable for manufacture on an industrial scale.

The laser generator described hereinabove is a gas laser, but it is clear that the invention could equally well be applied to solid or liquid lasers.

What is claimed is:

1. In a laser generator including: a resonant cavity formed by two reflectors, an active medium disposed in the cavity, pumping means associated with said active medium, and an optical element disposed between the active medium and one of said reflectors, the improvement comprising:

a sleeve surrounding a portion of said cavity and cooperating with said active medium, means carried by the wall of said sleeve to regulate the position of said optical element relative to the active medium, said means for regulating the position of said optical element being constituted by a semi-spherical dish supporting said optical element, and a portion of the surface of the dish being slidable relative to a semispherical portion of the surface of the wall of said sleeve and forming therewith a ball joint, and means carried by the wall of said sleeve to regulate the position of one of said reflectors relative to the active medium, said means for regulating the position of said one reflector comprising a cup supporting said one reflector, an aperture formed within said sleeve, said cup being disposed on said sleeve to overlie said aperture, and means including the edge portion of said cup and a semispherical portion of the surface of the wall of said sleeve surrounding said aperture forming a ball joint therebetween.

2. The laser generator according to claim 1, further comprising means for regulating the distance between said optical element and said dish.

3. The laser generator according to claim 1, wherein: said sleeve, said dish and said cup are manufactured from a material identical with that constituting said discharge tube.

* * * * *